United States Patent [19]

Grawey

[11] 4,283,366
[45] Aug. 11, 1981

[54] TIRE CURING METHOD

[75] Inventor: Charles E. Grawey, Peoria, Ill.

[73] Assignee: Caterpillar Tractor Co., Peoria, Ill.

[21] Appl. No.: 164,648

[22] Filed: Jun. 30, 1980

Related U.S. Application Data

[63] Continuation-in-part of Ser. No. 965,533, Nov. 20, 1978, abandoned.

[51] Int. Cl.³ .............................................. B29H 5/02
[52] U.S. Cl. .................................. 264/502; 264/347; 425/28 R
[58] Field of Search ...................... 264/347, 502, 501; 425/34 A, 28 R

[56] References Cited

U.S. PATENT DOCUMENTS

| | | | |
|---|---|---|---|
| 1,161,966 | 11/1915 | Price | 264/347 |
| 1,833,009 | 11/1931 | Wakl | 425/34 A |
| 3,606,921 | 9/1971 | Grawey | 425/28 R X |
| 3,793,420 | 2/1974 | Fredricks et al. | 264/502 |
| 3,883,287 | 5/1975 | Grawey et al. | 425/28 R X |
| 3,903,227 | 9/1975 | Sarumaru | 264/502 X |

Primary Examiner—J. Howard Flint, Jr.
Attorney, Agent, or Firm—Wagner, Stellman, McCord, Wood & Dalton

[57] ABSTRACT

A method of curing a green rubber tire (40) having a closed interior cavity (42) with two spaced ports (46,48) extending from the interior cavity to the tire exterior. The method includes the step of forming the tire on the porous, disintegratable core (44) and then positioning the tire within a pressure vessel (50). The pressure vessel and the interior cavity and porous core are then filled with a liquid (52) at an elevated temperature which is sufficient to cure the green rubber. The liquid is then circulated at the elevated temperature through the pressure vessel around the exterior of the tire and through the porous core and the interior cavity of the tire.

8 Claims, 3 Drawing Figures

TIRE CURING METHOD

DESCRIPTION

Cross Reference

This application is a continuation-in-part of my copending, commonly assigned application Ser. No. 965,533, filed Nov. 20, 1978 and entitled "Tire Curing Method", now abandoned.

Technical Field

This invention relates to vulcanization methods, and more particularly, to the vulcanization of hollow articles as, for example, tires.

Background Art

Many hollow articles formed of rubber are vulcanized in molds and in a number of instances, such as process is quite satisfactory. However, when the article is large in size, for example, a tire for a construction vehicle or an off the road truck, or the like, the mold must be extremely large and therefore is expensive to fabricate.

Moreover, in the case of large articles such as those mentioned above, because of the mass of the rubber to be vulcanized, a considerable period of time is required to achieve desired vulcanization of all parts of the article. The relatively long period is necessary to allow heat to fully penetrate the article to raise all parts to a desired temperature to achieve the desired cure. As a result, an outer layer of the article nearest the mold from which the heat is applied may be overcured in the process of achieving the desired cure at point in the article most remote from the source of heat. Alternately, if the desired cure is achieved at the point nearest the heat source, points on the article furthest away from the heat source may be undercured.

Additionally, since pressure is typically applied to the interior of the article to force the same against the wall of the mold to conform thereto, great care must be taken to insure that the raw article has exactly the proper mass and dimension. If the dimensions are too large, it may be impossible to introduce the article into the mold without further processing while if too small, or of too little mass, the application of pressure will result in the raw rubber flowing more than the desired distance to contact with the mold wall which in turn may result in weak spots in the finished article.

In order to eliminate certain of the problems associated with mold curing of articles, other methods have been proposed. In U.S. Pat. No. 2,271,855 issued Feb. 3, 1942 to Cleveland et al, there is disclosed a pressure vessel in which a rubber article, i.e., a tire, can be supported while steam is introduced into the chamber to raise the temperature therein to vulcanize the tire. Consequently, vulcanizing heat is applied to the article both from the outside in and from the inside out minimizing the length of time required to achieve the desired cure as well as minimizing the possibility that part of the article will be undercured while other parts will be overcured. However, articles made according to the Cleveland et al process may be considerably distorted from their desired form. As is well known, green rubber, when heated and before it becomes cured, tends to flow, albeit slowly. As a consequence, due to the influence of gravity, the articles cured by Cleveland et al will droop as heating is initiated and when the cure is realized, they will be permanently set in a configuration other than that desired.

One means of avoiding deformation of the article during vulcanization is inherently found in the process described in U.S. Pat. No. 1,295,594 issued Feb. 25, 1919 to Price. Price indicates the vulcanization can be achieved by steam under pressure in much the same manner disclosed by Cleveland et al. Price also indicates that vulcanization can be achieved by placing the article to be vulcanized in a bath of liquid such as water, paraffin, glycerin, etc.

To the extent that such substances have specific gravity of the same order as the article to be vulcanized, such substances tend to support the article against the influence of gravity so that drooping does not occur to any appreciable extent. However, Price finds it necessary to introduce the article to be vulcanized into the bath on a form or the like so as to support the article against collapse during the vulcanizing process. As a consequence, vulcanizing heat is applied to the article only from the outside in so that the problem of overcuring of some parts of the article coupled with undercuring of other parts remains.

In U.S. Pat. No. 1,161,966 issued Nov. 30, 1915, also to Price, there is disclosed a means by which the interior of a hollow article such as a tire can be filled with a heat conducting liquid which theoretically should alleviate the difficulty mentioned in the immediately preceding paragraph. However, it will be readily appreciated that once the heat in the liquid introduced into the interior of the hollow article is absorbed by the article during the vulcanization process, there are no means provided whereby additional heat can be applied to the liquid within the interior of the article. Consequently, at some point in the process, vulcanization can only occur by the application of heat from the outside in. As a result, a prolonged process must occur and the problem of unequal curing, while alleviated in part, still remains. Moreover, it is possible that flow of the rubber forming the article may distort the same to an undesirable shape due to either partial or entire collapse of the tire when not supported on a rigid form or by expansion of the interior cavity thereof due to the application of a pressurized liquid thereto which is not counteracted by an exterior pressure.

DISCLOSURE OF THE INVENTION

In one aspect of the invention, there is provided a method of curing a green rubber tire having a closed interior cavity with two spaced ports extending from the interior cavity to the tire exterior. The method includes the steps of forming the green rubber tire on a porous disintegratable core and positioning the tire thus formed within a pressure vessel. The vessel and the interior cavity and porous core are then filled with a liquid at an elevated temperature which is sufficient to cure the rubber. The liquid is circulated at the elevated temperature through the pressure vessel and around the exterior of the green rubber tire and simultaneously, liquid is circulated at the elevated temperature through the porous core and the interior cavity of the tire.

The technical problems posed by curing or vulcanization within molds are solved by the method of the invention as vulcanization takes place in a non-mold environment in the method. Drooping due to gravity is avoided by reason of the vulcanization occurring with the article in a liquid bath which minimizes the gravitational effect.

Prolonged curing periods are avoided in that heat necessary to effect the cure is applied to the article both from its interior and its exterior. Collapse or expansion of the article to an undesired configuration is avoided by maintaining pressure on the interior of the article at a level that does not appreciably deviate from the pressure on the exterior of the article. Continued application of heat to the interior and exterior of the article throughout the process to insure accelerated curing is accomplished by simultaneously flowing heated liquid through the interior of the article and the liquid bath.

BEST MODES FOR CARRYING OUT THE INVENTION

Figure 1:
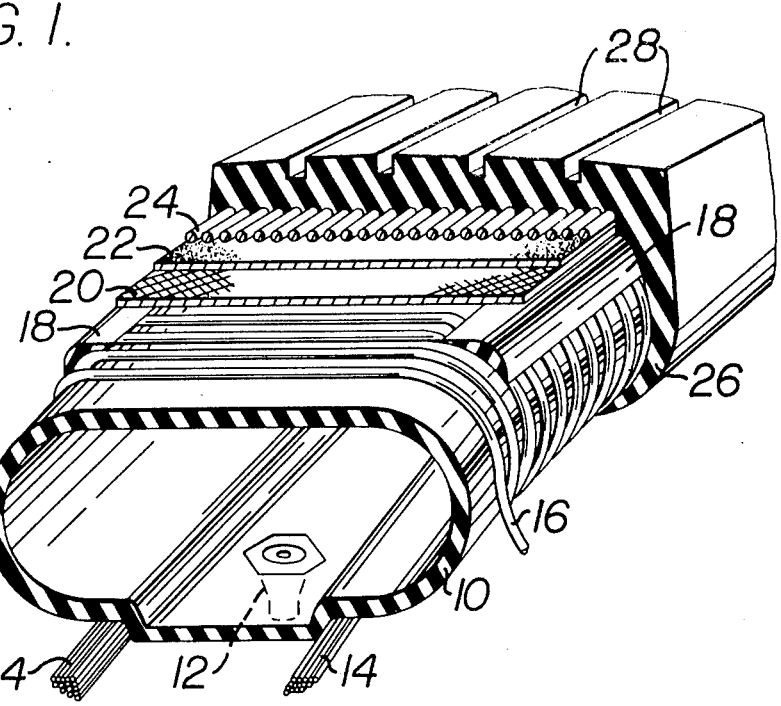
FIG. 1 is a fragmentary, perspective view of an article that may be vulcanized according to one embodiment of the method of the present invention with parts broken away and shown in section for clarity.

One type of a rubber article that may be cured according to one or more embodiments of the method of the present invention is illustrated in FIG. 1 in the form of a tire. However, it will be appreciated from the following description that the invention is not restricted to use in curing tires of the type illustrated in the drawings but may be used with efficacy in the curing of green rubber articles or other types having hollow interiors or substantially closed interiors.

The tire illustrated in FIG. 1 is preferably formed according to the method disclosed and claimed in U.S. Pat. No. 3,776,792 issued Dec. 4, 1973 to Charles E. Grawey, the details of which are herein incorporated by reference. For illustrative purposes, it will be described briefly herein, it being understood that further details of the fabrication procedure may be had by reference to the above mentioned Grawey patent.

The tire includes a tube 10 which preferably is fabricated on a hollow porous core in the manner disclosed in the U.S. Pat. No. 4,044,085 issued Aug. 23, 1977 to Charles E. Grawey. In a typical case it will be provided with at least two valve stem units 12 on its interior through which air may be introduced into the interior of the tube 10. The valve stem units 12 are placed in ports formed on the interior of the tube 10, which ports will be diametrically opposed if only two are used and perform a function in the method of the present invention as will be seen.

Near the base of each sidewall part of the tube 10, there is provided circumferential bands 14 which serve as roll restraining hoops and the configuration thus far described is wrapped with a plurality of loops of an inextensible filament 16.

Uncured rubber shoulders 18 are applied as illustrated and a circumferential fabric layer 20 then applied. A thin layer 22 of uncured rubber is then applied to the circumference of the fabric 20 although, if desired, the fabric 20 can be impregnated with uncured rubber at the time of its application and the layer 22 omitted. An inextensible circumferential belt 24 is applied to the layer 22 and then strips of uncured rubber are laid up on the assemblage to form an outer carcass 26 totally surrounding the already described components. The outer carcass 26, at this point in the process of manufacture of the tire will be uncured. After the tire is cured, a tread pattern 28 may be cut into the outer circumference of the tire as desired.

Figure 2:
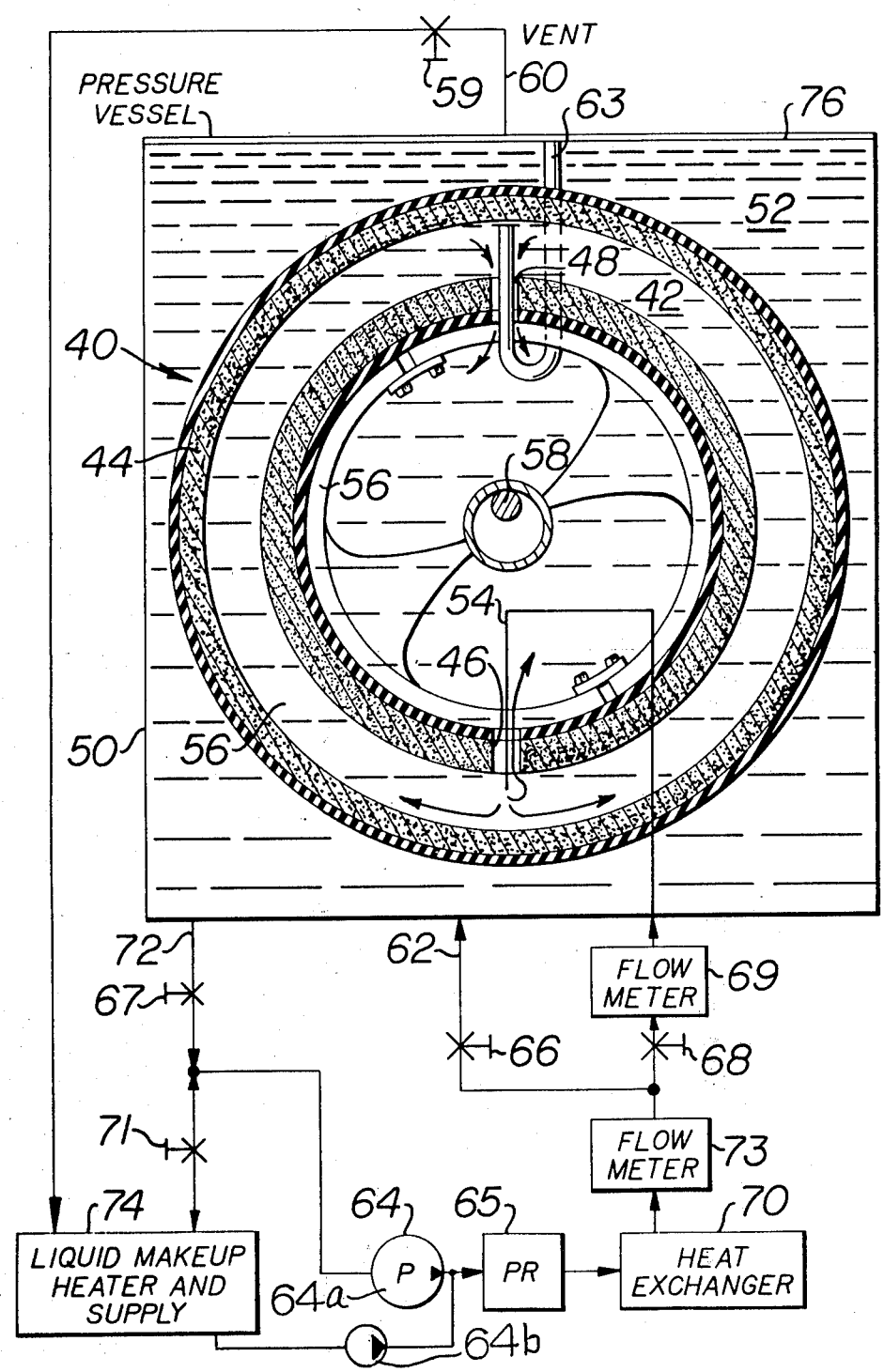
FIG. 2 is a somewhat schematic view of an article being cured according to one embodiment of a method of the invention.

FIG. 2 illustrates a green rubber article such as the tire illustrated in FIG. 1 being cured according to a method of the present invention. The article is generally designated 40 and has a hollow interior 42 which in turn is partially occupied by a hollow porous core 44 as alluded to previously. Preferably, the core 44 is made up of a particulate material such as silica and held in its desired position by a dissolvable binder.

At diametrically opposed points, the article 40 includes ports 46 and 48 extending to the interior cavity 42 through the core 44 and which may subsequently receive the valve stems 12 as mentioned.

The tire 40, after forming as above, is disposed in a pressure vessel 50 sized to accommodate the article and which ultimately will contain a liquid bath 52 that will completely encompass the article 40. The liquid forming the bath 58 will typically have a specific gravity on the same order as that of the article 40 so as to negate the effects of gravity on the article when the same is vulcanized within the vessel 50 to prevent flowing of the incured rubber with the resultant deformation of the article. In the present embodiment, the liquid used is water.

A probe 54 which may be the end of a suitable conduit is introduced through the port 46 into the interior 42 of the article for flowing a heated liquid 56 through the interior 42 of the article 40.

Certain of the liquid introduced through the probe 54 may escape through the port 46 around the side of the probe 54 while the remainder will flow through the interior 42 to emerge from the port 48 as illustrated by arrows.

The article 40 is suspended within the vessel 50 free of external constraint. This is not to say that some confinement of the article 40 is undesirable, but rather, to say that the article 40 may shift somewhat within the bath 52. In actuality, some confinement may be necessary including the use of some supporting means to support the article 40 above the bottom of the vessel 50 and out of contact with the sides thereof, particularly during the introduction of the liquid bath 52. For example, one or two narrow supporting rings 57 loosely received on a mandrel 58 secured to the wall of the vessel 50 may be used so long as they do not obstruct the ports 46 and 48. In this connection, it is preferable that the vessel 50, particularly when large articles are being vulcanized, by front loading rather than top loading to allow the article 40 to be easily introduced into the vessel 50. Obviously, when a front loading vessel 50 is employed, it is impossible to maintain the bath 52 within the vessel 50 during the loading process.

The vessel 50 is provided with an air vent 60 at its uppermost extreme and a liquid inlet 62. A U-shaped probe or exhaust tube 63 is inserted loosely through the port 48 such that its end within the tire 40 is substantially at the uppermost point of the interior 42 to allow air trapped in the interior 42 to exit to the interior of the vessel 50 to be removed through the vent 60. Both the probe 54 and the inlet 62 are connected in common to the output of a pump system 64 via valves 66 and 68 respectively which may be used to proportion flow to the probe 54 and inlet 62. The pump system 64 preferably has a pump 64a which provides relatively high volume delivery of liquid during filling and a boost pump 64b which generates high pressure, i.e., about 450 psi or more, in the liquid in the vessel 50, when filled.

The pump system 64 may be located upstream or downstream of a heat exchanger 70 employed to heat the liquid. Liquid to the pump 64 may be alternately received from an outlet 72 from the vessel 50 via a valve 67 to provide for recirculation or, initially, from a vat 74 containing heated makeup liquid via a valve 71.

Initially, the article 40 will be deposited in the vessel 50 and probes 54 and 63 inserted in the ports 46 and 48 respectively. The vessel 50 may then be closed and heated liquid from the makeup source 74, introduced into the vessel via valve 71, the pump 64a, pressure regulator 65, heat exchanger 70 and valve 66 until the article 40 floats within the pressure vessel 50. Thereafter the valve 68 is opened so that introduction of the liquid may occur simultaneously through the inlet 62 as well as through the probe 54. When the article 40 to be vulcanized is large, it is preferable that during the introduction of the liquid, care be taken to insure that the level of the liquid within the interior 42 of the article 40 be maintained at the same level as the liquid on the exterior of the article 40 after it is initially floated within the vessel 50. This is easily accomplished when the probe 54 is loosely received within the port 46 in that any excess liquid within the interior 42 will flow out of the port 46 into the vessel 50 to maintain equal levels or if the level within the vessel begins to exceed the level within the interior 42 of the article 40, liquid may flow into the port 46 to maintain equal levels.

During the filling process, the vent 60 is opened to vat 74 through valve 59 until the liquid reaches the level illustrated at 76, at which time, the article 40 is generally submerged but suspended within the bath 52 by reason of the closeness of the specific gravity of the article 40 to that of the liquid bath 52. The U-shaped vent tube 63 inserted in port 48 in the article 40, assures that no air is trapped within the hollow interior 42 during the filling process so that the pressure vessel 50 and hollow interior 42 are both completely filled with the liquid.

When the level 76 is attained, the valves 59 and 71 are closed to isolate the supply tank 74 from the pressure vessel 50. At this time, the valve 67 is opened so that liquid may be withdrawn from the vessel 50 for reheating to maintain the desired temperature of the bath via a path including the valve 67, the boost pump 64b, the pressure regulator 65, the heat exchanger 70, etc.

Once the pressure vessel 50 is isolated from the supply tank 74, the pump 64b is used to elevate the pressure in the vessel 50 to a desired level along with the pump 64a which circulates the curing liquid. Pressure may be controlled completely independently of the temperature being maintained in the vessel 50. For example, if the desired cure temperature was 300° F., the normal pressure required in the vessel 50 to prevent boiling would be 53 lbs. per square inch. By use of the pump 64b, a considerably higher pressure up to the capability of the pump 64, can be maintained within the vessel 50 with the desired pressure being controlled by the regulator 65. And, if desired, an even lower temperature as, 230° F., could be used.

In any event, this sytem capability allows the pressure applied to the green rubber article to be many atmospheres above that required to maintain the liquid in a non-boiling condition with temperature control being provided strictly by the heat exchanger 70. Consequently, the rate at which cure takes place is controllable independently of pressure and the pressure applied is controllable independently of cure rate. This ability to achieve high pressure at low temperatures allows uniform curing while providing for elimination of voids in the rubber itself as well as any voids that may occur between parts of the rubber as a result of the fabrication process by which the article is made.

The valves 66 and 68 are adjusted to establish proper flow rates at the probe 54 and the inlet 62 to assure deliver of sufficient liquid to maintain substantially the desired cure temperature. Indications of flow rate are provided by the flow meters 69 and 73.

The fact that the curing liquid applied to the interior 42 of the article 40 must flow from one side thereof to the opposite side to exit into the bath requires that it be introduced into the interior 42 at a pressure sufficient to cause such flow, which pressure must necessarily be above that in the bath.

When the method described in conjunction with the description of the components shown in FIG. 2 is employed, it is necessary that the pressure within the interior 42 of the article 40 and the pressure of the liquid bath 52 be maintained essentially equal. Because the liquid within the interior 42 of the article 40 penetrates the core 44 by reason of the particulate porous nature of the latter to thereby come into contact with the interior of the article 40 to apply vulcanizing heat thereto, excess pressure in the interior 42 of the article would cause the uncured rubber, now in a particularly flowable state due to its elevated temperature, to flow away from the core 44 to expand to an undesired configuration.

At the same time, because the pressure on the interior 42 of the article 40 must necessarily be slightly greater than that within the bath 52 in order to achieve the desired flowing of the liquid from the probe 52 through the interior to the port 48 to exit into the bath. It is believed that when pressure in the interior 42 of article 40 is about 0.5 psi greater than pressure within the bath 52 the desired flow of liquid within the article interior is achieved and undesirable rubber flow does not occur.

The application of pressure after the bath has been filled to the level 76 not only enables the vulcanization process to take place at any desired temperature, but also provides the advantage of compacting the laid up structure to eliminate voids that may be present.

Because heat is applied to the article both from the outside in and from the inside out, the period required for the desired vulcanization is minimized as is the problem of overcuring one part of the article while undercuring another part more remote from the heat source. At the same time, by flowing the heat applying liquid through the interior of the article, there is a constant input of heat necessary to effect the cure to the inside of the article 40. And, of course, undesirable features of mold type vulcanization are avoided completely.

Figure 3:
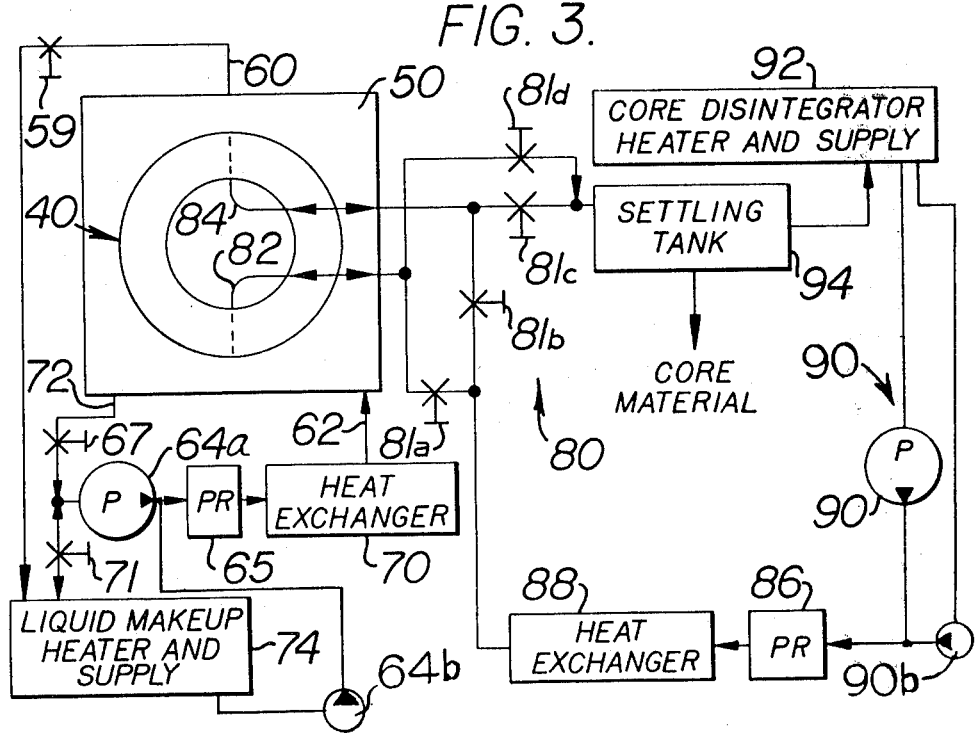
FIG. 3 is a schematic view similar to FIG. 2 illustrating the curing of an article according to another embodiment of the method of the present invention.

FIG. 3 illustrates a modified embodiment wherein vulcanization and removal of the core can be simultaneously obtained. Liquid is introduced into the interior of the vessel 50 through the components illustrated which, where identical to those described previously in connection with FIG. 2, are given like reference numerals.

The probe 54 is dispensed with and in lieu thereof, a probe 82 is utilized and the same is adapted to be sealingly disposed within the port 46. A similar probe 84 is employed and it is adapted to be sealingly received within the port 48. As a consequence, there is total isolation between the liquid applied to the exterior of the article 40 within the vessel 50 and that applied to the interior thereof.

The inlet stream to the interior of the article 40 is provided via a heat exchanger 88 receiving liquid from the pressure regulator 86 which in turn is provided with liquid via a pump system 90 having a high volume pump 90a and a high pressure boost pump 90b like the pump system 64 and its pumps 64a and 64b. The pump system 90 receives liquid from a tank 92 containing a core disintegrater solution. The probe 82 extends to the lowermost region of the hollow interior of article 40 and probe 84 extends to the uppermost region as illustrated by dotted lines in FIG. 3 for purposes to be explained later. A plumbing arrangement 80 including valves 81a, 81b, 81c, 81d permits reversal of flow of fluid within the interior of the article 40 during the curing operation.

The probes 82 and 84 also connect via the plumbing arrangement 80 to a settling tank 94. A liquid line extends from the settling tank 94 to the tank 92.

When materials such as those identified in the previously identified U.S. Pat. No. 3,776,792 to Grawey are utilized to form the core, the same core disintegrating solution identified therein may be utilized and typically may constitute 10% solution of sodium hydroxide.

In the embodiment of FIG. 3 fluid from the vat 74 is initially introduced via the inlet 62 to pressure vessel 50 to float the article 40 identically to the procedure described with reference to FIG. 2. Thereafter core disintegrating solution is simultaneously introduced to the interior of the article 40 from the heat exchanger 88 via valve 81a and probe 82 to fill the hollow interior. During the filling process probe 84 is connected to the settling tank 94 via valve 81c and the location of the end of probe 84 at the uppermost region of the hollow interior of article 40 insures that no air is trapped within the article.

In any event, the core disintegrating solution is pumped by the pump 90a through the pressure regulator 86 to the heat exchanger 88 to be heated to the desired temperature and is introduced through the probe 82 during the time when the hollow interior of the article is filled. It will then flow through the interior of the article 40 to emerge via the probe 84 to flow through the settling tank 94 and return to the supply tank 92.

When the pressure vessel 50 and the hollow interior of article 40 are filled with fluid valves 59 and 71 are closed and valve 67 is opened to recirculate fluid in the pressure vessel by the pump 64a and the pump 64b is activated to elevate pressure on the tire exterior. At the same time valve 81a is closed and valve 81b is opened to communicate core disintegrating solution to probe 84, and valve 81c is closed as valve 81d is opened to connect probe 82 to settling tank 94 thereby reversing direction of fluid flow in the hollow interior of article 40 by operation of the pump 90a. The boost pump 90b is activated to elevate pressure on the interior of the tire to substantially the same value as pressure provided by the boost pump 64a, control being provided by the regulators 65 and 86. The probe 82 now carries liquid discharging from within the article 40. Heated pressure fluid continues to be recirculated within the pressure vessel 50 by pump system 64 and within the hollow interior of article 40 by pump system 90 for a time sufficient to cure article 40. During this period the particulate matter of the core is carried out of the article by the forementioned reversed fluid flow to settle within tank 94 and can be extracted therefrom for reuse. At the same time the solution with particulate matter removed will flow to the tank 92 to be recirculated. Complete removal of particulate matter is assured by the location of the end probe 82 at the lowermost region in the hollow interior of article 40.

During this time, the pressures of the fluids within the vessel 50 and the interior of the article are elevated many atmospheres above that required to prevent the fluid from boiling through the use of the high pressure capability of the two boost pumps 64b and 90b. The pressures are maintained sufficiently high as to achieve the desired rubber flow to eliminate voids during the curing process. The temperatures of the two fluids are controlled, as desired, by the heat exchangers 70 and 88.

In the embodiment illustrated in FIG. 3, the pressures interior and the exterior of the article 40 should be maintained essentially equal, i.e. no more than about a 0.6 psi differential. The greater pressure may occur on either the inside or the outside since the two liquid streams are totally isolated. The pressure of the stream through the interior of the article 40 need not be maintained somewhat higher than that applied to the exterior of the article in order to achieve flow as was the case with the embodiment illustrated in FIG. 2.

In either embodiment, the pressure of the fluid or fluids is established to achieve the desired rubber densification during curing to eliminate voids and is not used to control temperature, temperature being controlled by the various heat exchangers. Thus, the process is not dependent upon the usual temperature-pressure relationship typically found in liquid curing processes. Thus, high densification of the rubber can be obtained through high pressure without the attendant high temperature heretofore required which could cause uneven curing. Voids in the structure, whether microscopic as typically found in raw rubber, or those inherently present in any article laid up using multiple rubber strips can be eliminated to the extent desired.

A further advantage is provided by the fact that the equipment required to cure articles according to the invention costs approximately 1/10 of the cost of conventional mold curing equipment for similar articles as tires. Similarly, one vessel of sufficient size to cure the largest article to be cured can be employed in the curing of smaller articles, which would require separate molds of different sizes if cured by a mold curing process.

The precise temperatures, pressures and curing times utilized form no part of the present invention since such parameters may vary depending upon the specific nature of the article 40 and/or the specific components, i.e., types of green rubber, utilized in forming the article. They may likewise depend upon the desired degree of cure to be achieved. It is also contemplated that the invention may be used advantageously in partially curing green rubber articles.

INDUSTRIAL APPLICABILITY

The operation of the inventive method is believed to be fully understood from the foregoing description of the best modes for carrying out the invention. It will be appreciated that the same may be advantageously employed wherever vulcanization within molds is undersirable or uneconomical. It will be readily appreciated that the invention solves the numerous problems associated with prior non-mold vulcanization processes and is particularly useful where large objects, such as tires, are to be vulcanized.

Other aspects, objects and advantages of this invention can be obtained from a study of the drawings, the disclosure and appended claims.

I claim:

1. A method of curing a green rubber tire having a closed interior cavity with two spaced ports extending from the interior cavity to the tire exterior comprising the steps of:
   (a) forming the green rubber tire on a porous disintegratable core;
   (b) positioning the green rubber tire within a pressure vessel;
   (c) filling the pressure vessel and the interior cavity and porous core with a liquid at an elevated temperature which is sufficient to cure rubber;
   (c) circulating liquid at the elevated temperature through the pressure vessel and around the exterior of the green rubber tire; and
   (e) simultaneously circulating liquid at the elevated temperature through the porous core and the interior cavity of the tire.

2. The method of claim 1 including the step of inserting an exhaust tube through one of the ports and into the interior cavity of the green rubber tire at a position for venting all air from the interior cavity of the tire during the filling of the interior cavity with the liquid.

3. The method of claim 1 wherein steps (e) includes the step of exhausting the liquid from the interior cavity of the tire directly into the liquid being circulated through the pressure vessel.

4. The method of claim 1 including the step of controlling the circulation of the liquid through the interior cavity of the tire separately from the controlling of the circulation of the liquid through the pressure vessel.

5. The method of claim 1 including the step of pressurizing the liquid in both the interior cavity of the tire and the pressure vessel to a pressure greater than the pressure temperature relationship of the liquid.

6. A method of curing a green rubber tire having a closed interior cavity with two spaced ports extending from the interior cavity to the tire exterior comprising the steps of:
   (a) positioning the green rubber tire within a pressure vessel;
   (b) filling the pressure vessel and the interior cavity of the tire with a liquid at an elevated temperature sufficient to cure rubber;
   (c) circulating liquid at the elevated temperature through the pressure vessel and around the exterior of the green rubber tire;
   (d) simultaneously circulating liquid at the elevated temperature through the interior cavity of the tire; and
   (e) controlling the circulation of the liquid through the interior cavity of the tire independently of the controlling of the circulation of the liquid through the pressure vessel while maintaining a pressure differential from the interior to the exterior of the tire insufficient to cause the rubber to flow.

7. The method of claim 6 including the step of inserting an exhaust tube through one of the ports and into the interior cavity of the green rubber tire to a position for venting all air from the interior cavity of the tire during the filling of the interior cavity of the tire with the liquid.

8. The method of claim 6 including the step of pressurizing the liquid in both the interior cavity of the tire and the pressure vessel to a pressure greater than the temperature pressure relationship of the liquid.

* * * * *